US011590621B2

(12) United States Patent
Liu

(10) Patent No.: US 11,590,621 B2
(45) Date of Patent: Feb. 28, 2023

(54) MACHINE TOOL AND MACHINING PROCESS CHANGE METHOD

(71) Applicant: FANUC CORPORATION, Minamitsuru-gun (JP)

(72) Inventor: Sichen Liu, Yamanashi-ken (JP)

(73) Assignee: FANUC CORPORATION, Yamanashi-Ken (JP)

( * ) Notice: Subject to any disclaimer, the term of this patent is extended or adjusted under 35 U.S.C. 154(b) by 0 days.

(21) Appl. No.: 16/799,494

(22) Filed: Feb. 24, 2020

(65) Prior Publication Data

US 2020/0276679 A1    Sep. 3, 2020

(30) Foreign Application Priority Data

Feb. 28, 2019 (JP) .............................. JP2019-035182

(51) Int. Cl.
*B23Q 15/16* (2006.01)
*B23Q 3/155* (2006.01)
*G05B 19/4065* (2006.01)

(52) U.S. Cl.
CPC ......... *B23Q 15/16* (2013.01); *B23Q 3/15503* (2016.11); *G05B 19/4065* (2013.01); *Y10T 409/30084* (2015.01); *Y10T 483/138* (2015.01); *Y10T 483/14* (2015.01)

(58) Field of Classification Search
CPC ................ B23Q 3/15503; B23Q 15/16; B23Q 17/09–0923; B23Q 17/2457–2466; G05B 19/4065; G05B 2219/37616; G05B 19/404; G05B 2219/36266; G05B 2219/36504; G05B 2219/36584; Y10T 409/30084; Y10T 483/136–15

USPC ................ 409/10, 11, 12, 13, 289; 700/176; 483/10, 11, 12, 13

See application file for complete search history.

(56) References Cited

U.S. PATENT DOCUMENTS

| 5,255,199 A | * | 10/1993 | Barkman | ............... | B23Q 17/09 348/94 |
| 5,568,028 A | * | 10/1996 | Uchiyama | .......... | G05B 19/4065 318/433 |
| 7,331,739 B2 | * | 2/2008 | Yoshida | ................. | B23Q 15/16 409/131 |

(Continued)

FOREIGN PATENT DOCUMENTS

| EP | 1027954 A1 | * | 8/2000 | ......... | B23Q 17/0995 |
| JP | 58-126038 A | * | 7/1983 | ....... | G05B 19/41825 |

(Continued)

OTHER PUBLICATIONS

Japanese Office Action, dated May 25, 2021, in Japanese Patent Application No. 2019-035182 and English Translation thereof.

*Primary Examiner* — Boyer D Ashley
*Assistant Examiner* — Michael Vitale
(74) *Attorney, Agent, or Firm* — McGinn I.P. Law Group, PLLC.

(57) ABSTRACT

A machine tool includes: an imaging unit for capturing an image of a tool from a side of the tool; a shape extraction unit for extracting the shape of the tool from the image of the tool captured by the imaging unit; a wear detection unit for detecting the degree of wear of the tool based on the shape of the tool; and a changing unit for changing at least one of the pitch and the depth of cut according to the degree of wear.

11 Claims, 6 Drawing Sheets

(56) References Cited

U.S. PATENT DOCUMENTS

| | | | | |
|---|---|---|---|---|
| 2004/0187654 A1* | 9/2004 | Kato | ............... | B24B 13/046 |
| | | | | 82/1.11 |
| 2013/0151000 A1* | 6/2013 | Mackman | ............ | G05B 19/4093 |
| | | | | 700/186 |
| 2014/0005823 A1* | 1/2014 | Otsuki | ............... | G05B 19/4103 |
| | | | | 700/189 |
| 2017/0239766 A1* | 8/2017 | Satou | ............... | B23Q 16/001 |
| 2019/0143467 A1* | 5/2019 | Wang | ............... | G01N 3/58 |
| | | | | 700/175 |
| 2019/0294139 A1* | 9/2019 | Adachi | ............... | G05B 19/19 |

FOREIGN PATENT DOCUMENTS

| | | | | |
|---|---|---|---|---|
| JP | 05138497 A | * | 6/1993 | |
| JP | 2005-088106 A | | 4/2005 | |
| JP | 2006-107073 A | | 4/2006 | |
| JP | 2006-284531 A | * | 10/2006 | |
| JP | 2011-041985 A | | 3/2011 | |
| JP | 2011-045988 A | | 3/2011 | |
| WO | WO-2005/023486 A1 | * | 3/2005 | ......... G05B 19/4065 |
| WO | WO-2015/104945 A1 | * | 7/2015 | ......... B23Q 3/15513 |
| WO | WO-2015/111200 A1 | * | 7/2015 | ............ G01B 11/24 |
| WO | WO-2017/216905 A1 | * | 12/2017 | ............ G01B 21/02 |

* cited by examiner

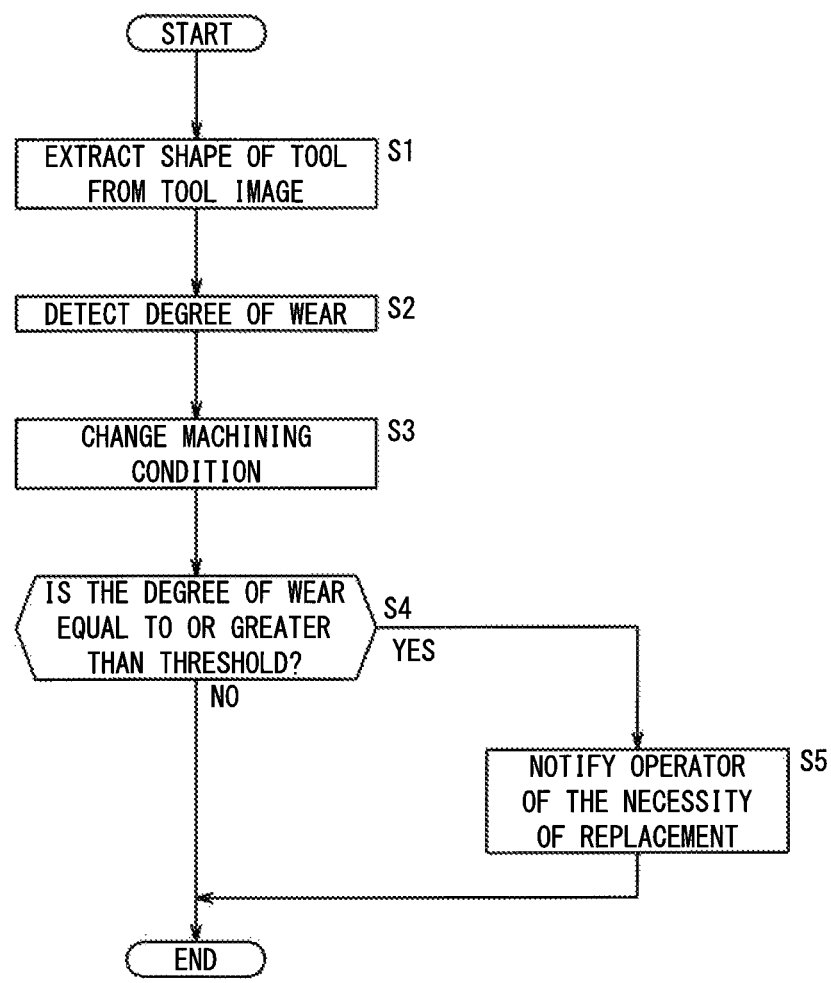

MACHINE TOOL AND MACHINING PROCESS CHANGE METHOD

CROSS-REFERENCE TO RELATED APPLICATION

This application is based upon and claims the benefit of priority from Japanese Patent Application No. 2019-035182 filed on Feb. 28, 2019, the contents of which are incorporated herein by reference.

BACKGROUND OF THE INVENTION

Field of the Invention

The present invention relates to a machine tool for performing hale machining for cutting, with a tool, an object to be machined (workpiece) along a cutting direction at a specified depth of cut and at intervals of a specified cutting pitch, and also relates to a machining process change method.

Description of the Related Art

When machining a workpiece using a tool, the tool wears as the amount of machining increases. When the tool is worn, a machining error occurs on the workpiece, hence the machining accuracy is liable to decrease. This tendency is particularly likely to appear in machine tools for precision machining.

Japanese Laid-Open Patent Publication No. 2005-088106 discloses a machining data compensation method in which the amount of shape change of a tool is estimated based on the machining distance of the tool or the length of time that has elapsed since the start of machining and the machining data indicating tool paths is then modified based on the estimated amount of shape change.

SUMMARY OF THE INVENTION

However, since the amount of shape change of a tool estimated from the machining distance of the tool or the length of elapsed time from the start of machining tends to vary depending on the tool type etc., there is a concern that degradation in machining accuracy may occur in the technique of Japanese Laid-Open Patent Publication No. 2005-088106.

It is therefore an object of the present invention to provide a machine tool and a machining process change method capable of improving machining accuracy.

A first aspect of the present invention resides in a machine tool that performs a hale machining for cutting a workpiece along a cutting direction at a specified depth of cut and at intervals of a pitch using a tool, including: an imaging unit configured to capture an image of the tool from a side of the tool; a shape extraction unit configured to extract the shape of the tool from the image of the tool captured by the imaging unit; a wear detection unit configured to detect the degree of wear of the tool based on the shape of the tool; and a changing unit configured to change at least one of the pitch and the depth of cut according to the degree of wear.

A second aspect of the present invention resides in a machining process change method for a machine tool that performs a hale machining for cutting a workpiece along a cutting direction at a specified depth of cut and at intervals of a pitch using a tool, including: a shape extraction step of extracting the shape of the tool from an image of the tool; a wear detecting step of detecting the degree of wear of the tool based on the shape of the tool; and a change step of changing at least one of the pitch and the depth of cut according to the degree of wear.

According to the present invention, since the degree of tool wear is detected based on the tool shape extracted from an image, it is possible to change the machining conditions of the hale machining so as to be suitable for the actual shape of the tool, and hence machining accuracy can be improved.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 6 is a flowchart showing a flow of a machining condition changing process in a machining condition changing device.

DESCRIPTION OF THE PREFERRED EMBODIMENTS

The present invention will be detailed below by describing a preferred embodiment with reference to the accompanying drawings.

EMBODIMENT

Figure 1:
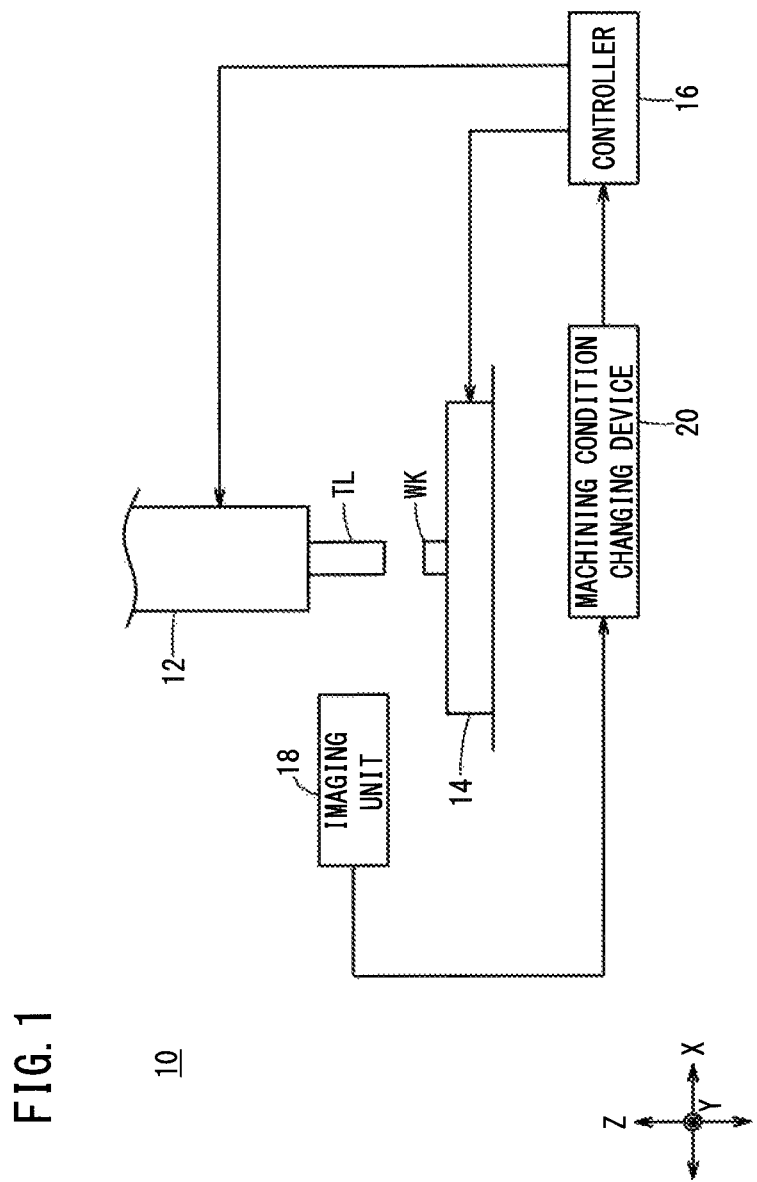
FIG. 1 is a schematic diagram illustrating a configuration of a machine tool.

FIG. 1 is a schematic diagram showing a configuration of a machine tool. A machine tool 10 machines a workpiece WK using a tool TL. The machine tool 10 may be a lathe machine or a machining center. Note that the machine tool 10 may be a lathe or a machining center for precision machining that machines the workpiece WK according to machining commands including machining accuracy in the order of 10 nanometers or less.

Figure 2:
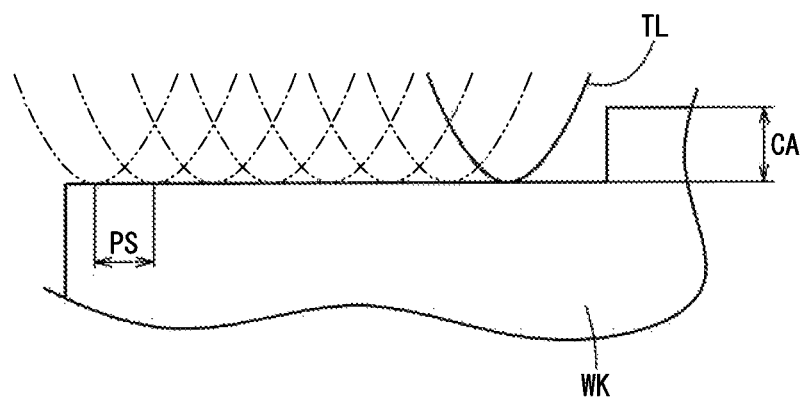
FIG. 2 is a view showing how a workpiece is machined in the hale machining.

FIG. 2 is a diagram showing how the workpiece is machined in a hale machining process. A hale machining process is a process for cutting a workpiece WK along a cutting direction at a specified cutting amount (depth of cut) CA and at intervals of a specified cutting pitch PS. The cutting amount CA indicates a depth at which the tool cuts into the workpiece WK, and the pitch PS is a distance (shift amount) by which the cutting position is shifted along the machining surface in the direction orthogonal to the cutting direction. In other words, the interval of the pitch is an interval between tool paths when machining a workpiece along a plurality of paths in the cutting direction. In FIG. 2, a direction perpendicular to the plane of paper of the drawing is the cutting direction. Examples of the tool TL used for hale machining include a hale tool (spring-necked tool) having a rake face, or the like.

The machine tool 10 executes the hale machining by moving the tool TL relative to the workpiece WK so as to machine the workpiece WK along the cutting direction at the specified depth of cut CA and at intervals of the specified pitch PS. Specifically, the machine tool 10 moves the tool TL relative to the workpiece WK so as to alternately repeat a cutting step for cutting the workpiece WK at the specified depth of cut CA along the cutting direction and a shifting step of shifting the cutting position in a direction along the machining plane by an interval of the specified pitch PS. Note that the tool TL and the workpiece WK are not rotated when performing the hale machining.

As shown in FIG. 1, the machine tool 10 includes a tool support 12, a work support 14, a controller 16, an imaging unit 18, and a machining condition changing device 20. In FIG. 1, a first direction along the axis of the tool TL is defined as the Z-axis direction, and a second direction and a third direction orthogonal to each other in the plane orthogonal to the first direction are defined as the X-axis direction and the Y-axis direction. The cutting direction is the X-axis direction.

The tool support 12 supports the tool TL, and the work support 14 supports the workpiece WK. When the machine tool 10 is a lathe machine, the tool support 12 is a tool table, and the work support 14 is a headstock (rotary table). When the machine tool 10 is a machining center, the tool support 12 is a spindle head, and the work support 14 is a table.

At least one of the tool support 12 and the work support 14 has a Z-axis moving mechanism for producing relative motion between the tool TL and the workpiece WK in the Z-axis direction. At least one of the tool support 12 and the work support 14 has an X-axis moving mechanism for producing relative motion between the tool TL and the workpiece WK in the X-axis direction. Further, at least one of the tool support 12 and the work support 14 has a Y-axis moving mechanism for producing relative motion between the tool TL and the workpiece WK in the Y-axis direction. The X-axis moving mechanism, the Y-axis moving mechanism and the Z-axis moving mechanism are each controlled by the controller 16.

The controller 16 has a machining program for performing a hale machining on the workpiece WK using the tool TL. The controller 16 controls the X-axis moving mechanism, the Y-axis moving mechanism and the Z-axis moving mechanism so as to cut the workpiece along the cutting direction at the depth of cut CA at intervals of the pitch PS, as specified by the machining program.

Specifically, the controller 16 controls the Z-axis moving mechanism so that the tool cuts into the workpiece at the depth of cut CA specified by the machining program. In this state, the controller 16 alternately repeats a control step of controlling the X-axis moving mechanism to make a movement along the cutting direction specified by the machining program and a control step of controlling the Y-axis moving mechanism to make a movement by the interval of the pitch PS specified by the machining program. Thus, the tool TL supported by the tool support 12 is pressed against the workpiece WK supported by the work support 14 to effect the hale machining on the workpiece WK.

The imaging unit 18 takes an image of the tool TL. The imaging unit 18 is arranged beside the tool TL to capture the image of the tool TL from the side. When the tool TL is a hale tool (a tool for performing a hale machining), the imaging unit 18 captures the image of the tool TL from the rake face side of the hale tool.

Figure 3:
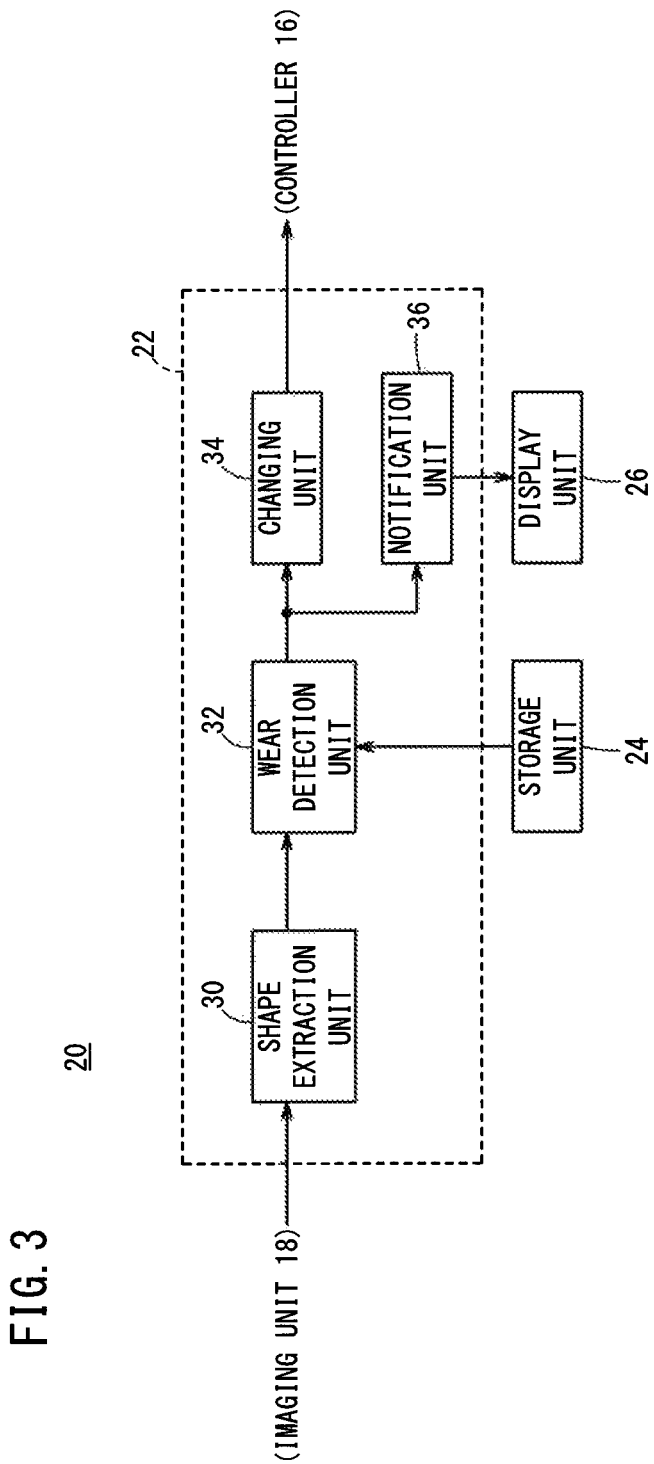
FIG. 3 is a schematic diagram showing a configuration of a machining condition changing device.

FIG. 3 is a schematic diagram showing the configuration of the machining condition changing device 20. The machining condition changing device 20 changes the machining condition of a machining program used in the controller 16, based on the image of the tool TL captured by the imaging unit 18, and includes a signal processing unit 22, a storage unit 24, and a display unit 26. The machining condition changing device 20 may be a general-purpose personal computer.

The signal processing unit 22 includes a processor and a memory that stores a change program for changing the machining condition. When the processor runs the change program, the signal processing unit 22 functions as a shape extraction unit 30, a wear detection unit 32, a changing unit 34, and a notification unit 36.

The shape extraction unit 30 extracts the shape of the tool TL from the image of the tool TL captured by the imaging unit 18. The shape extraction unit 30 extracts the shape of the tool TL by binarizing the image so as to obtain the boundary between the tool TL and the background in the image captured by the imaging unit 18.

The wear detection unit 32 detects the degree of wear of the tool TL based on the shape of the tool TL extracted by the shape extraction unit 30. When the shape of the tool TL is extracted by the shape extraction unit 30, the wear detection unit 32 detects whether there is a chip (recess) at the tip of the tool TL based on the extracted shape.

Figure 4:
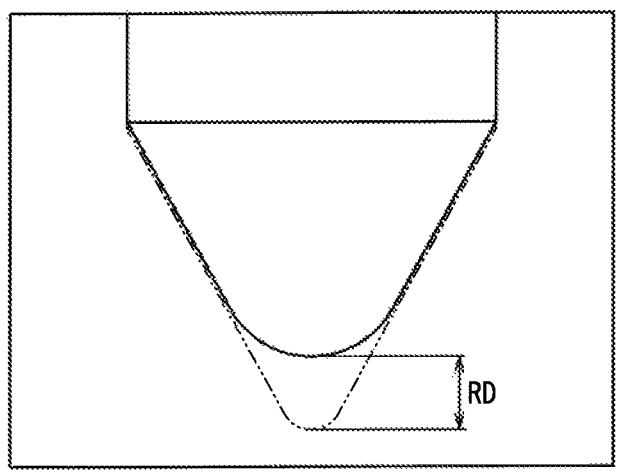
FIG. 4 is a diagram illustrating an example of an image obtained by imaging a tool not chipped at the tip.

Here, if there is no chip (recess) at the tip of the tool TL, the wear detection unit 32 detects the degree of abrasion of the tip of the tool TL as the degree of wear of the tool TL. As a parameter defining the degree of abrasion, a difference RD between the model tip shape of the tool TL stored in the storage unit 24 and the actual tip shape of the tool TL extracted by the shape extraction unit 30 as shown in FIG. 4, or the tool length of the tool TL extracted by the shape extraction unit 30, may be used. As the value of the parameter becomes greater, the degree of abrasion is regarded to be greater. In FIG. 4, the shape of the tool TL extracted by the shape extraction unit 30 is indicated by the solid line, and the model shape is indicated by the two-dot chain line.

The model shape is, for example, the shape of the tool TL extracted by the shape extraction unit 30 based on the image of a brand-new (unused) tool TL taken by the imaging unit 18. Note that when to capture the image for extracting the shape to be compared with the model shape may be, for example, at the time of tool change, at the start of hale machining, or during hale machining.

Figure 5:
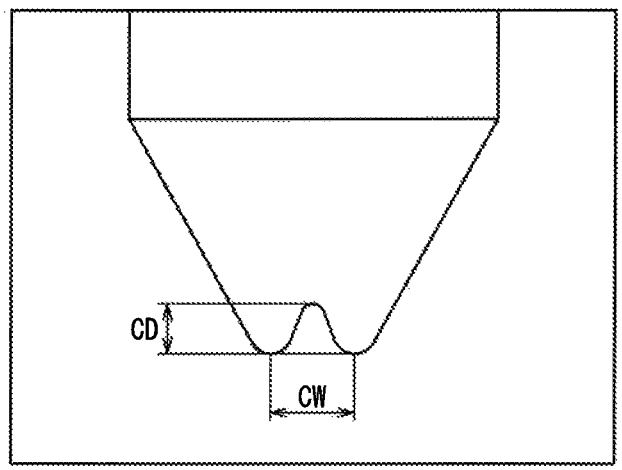
FIG. 5 is a diagram illustrating an example of an image obtained by imaging a tool chipped at the tip.

On the other hand, if there is a chip (recess) at the tip of the tool TL, the wear detection unit 32 detects the degree of chipping, as the wear of the tool TL. As shown in FIG. 5, the parameters defining the degree of chipping include at least one of the depth CD, the width CW, and the area of the chip (recess). The greater one parameter or the statistical value such as the average value of multiple parameters, the greater the degree of chipping is regarded to be.

The changing unit 34 changes the machining condition according to the degree of wear. When the degree of abrasion is detected by the wear detection unit 32, the changing unit 34 determines and acquires a depth of cut CA corresponding to the degree of abrasion detected by the wear detection unit 32, based on a database or a formula that defines the relationship between the degree of abrasion and the depth of cut CA. Specifically, the relationship between the degree of abrasion and the depth of cut CA is such that the greater the degree of abrasion, the greater the depth of cut CA.

On acquiring the depth of cut CA corresponding to the degree of abrasion detected by the wear detection unit 32, the changing unit 34 generates a command signal for changing the original depth of cut CA specified in the machining program to the acquired depth of cut CA and outputs the generated command signal to the controller 16. Thus, the depth of cut CA is changed to the acquired depth of cut CA determined based on the degree of abrasion detected by the wear detection unit 32.

On the other hand, when the degree of chipping is detected by the wear detection unit 32, the changing unit 34 determines and acquires a pitch PS corresponding to the degree of chipping detected by the wear detection unit 32, based on a database or a formula that defines the relationship between the degree of chipping and the pitch PS. Specifically, the relationship between the degree of chipping and the pitch PS is such that the greater the degree of chipping, the smaller the pitch PS.

On acquiring the pitch PS corresponding to the degree of chipping detected by the wear detection unit 32, the changing unit 34 generates a command signal for changing the original pitch PS specified in the machining program to the acquired pitch PS and outputs the generated command signal to the controller 16. Thus, the pitch PS is changed to the pitch PS determined based on the degree of chipping detected by the wear detection unit 32.

As described above, when the degree of abrasion is detected by the wear detection unit 32, the changing unit 34 increases the depth of cut CA as the degree of abrasion is greater, and when the degree of chipping is detected by the wear detection unit 32, the changing unit 34 decreases the pitch PS as the degree of chipping is greater.

The notification unit 36 gives a notice that the tool TL should be replaced. As the wear detection unit 32 detects the degree of wear, the notification unit 36 compares the detected degree of wear with a predetermined threshold. The threshold is determined for each of the degree of abrasion and the degree of chipping detected as the degree of wear by the wear detection unit 32.

Here, when the degree of wear (the degree of abrasion or the degree of chipping) detected by the wear detection unit 32 is less than the threshold, the notification unit 36 determines that the tool TL is unlikely to be at the end of tool life. In this case, the notification unit 36 does not give a notice that the tool TL should be replaced.

On the other hand, when the degree of wear (the degree of abrasion or the degree of chipping) detected by the wear detection unit 32 is equal to or greater than the threshold, the notification unit 36 determines that the tool TL is highly likely to have reached the end of tool life. In this case, the notification unit 36 notifies an operator that the tool TL should be replaced by displaying a warning message such as "The current tool shape cannot achieve the target machining. Replace the tool.", on the display unit 26.

When the machining condition changing device 20 is equipped with at least one of a speaker that outputs sound and a light emitter that emits light, the notification unit 36 may use at least one of sound and light to notify the necessity of replacement of the tool TL. When an external device including at least one of a display unit, a speaker and a light emitter is connected to the machining condition changing device 20, the notification unit 36 may transmit an operation signal to the external device so as to cause the external device to give a notice that the tool TL should be replaced.

Next, a machining condition changing method will be described. FIG. 6 is a flowchart showing the flow of a machining condition changing process in the machining condition changing device 20. The machining condition changing process may be carried out only once after a predetermined start time such as after a process start command is issued in response to an operator's start operation, or may be performed a multiple number of times at predetermined intervals from the start time.

At step S1, the shape extraction unit 30 acquires an image of the tool TL captured by the imaging unit 18 and extracts the shape of the tool TL from the obtained image. The shape extraction of the tool TL by the shape extraction unit 30 is followed by step S2.

At step S2, the wear detection unit 32 detects the degree of wear (the degree of abrasion or chipping) at the tip of the tool TL based on the shape of the tool TL extracted at step S1, and the process proceeds to step S3.

At step S3, the changing unit 34 changes the machining condition according to the degree of wear (the degree of abrasion or chipping) detected at step S2. That is, when the degree of wear detected at step S2 is the degree of abrasion, the changing unit 34 changes the depth of cut CA specified in the machining program so that the depth of cut CA becomes greater as the degree of abrasion is greater.

On the other hand, when the degree of wear detected at step S2 is the degree of chipping, the changing unit 34 changes the pitch PS specified in the machining program so that the pitch PS becomes smaller as the degree of chipping is greater.

When the changing unit 34 changes the machining condition (depth of cut CA or pitch PS), the process proceeds to step S4. At step S4, the notification unit 36 compares the degree of wear (the degree of abrasion or chipping) detected at step S2 with a predetermined threshold.

Here, when the degree of wear is less than the threshold, the notification unit 36 determines that the tool TL is unlikely to be at the end of tool life. In this case, the notification unit 36 ends the machining condition changing process without giving any notice of replacement of the tool TL.

On the other hand, when the degree of wear is equal to or greater than the threshold, the notification unit 36 determines that the tool TL is highly likely to have reached the end of tool life. In this case, the notification unit 36 proceeds to step S5, in which it notifies an operator (or a user) that the tool TL should be replaced, and thereafter the machining condition changing process is put to an end.

As described above, in the machine tool 10 according to the present embodiment, the degree of wear is detected based on the shape of the tool TL extracted from the image, and then the depth of cut CA or the pitch PS, which is the machining condition of hale machining, is changed according to the degree of wear. As a result, it is possible to change the machining condition for the hale machining so as to be suitable for the actual shape of the tool TL, and hence machining accuracy can be improved.

MODIFIED EXAMPLES

Though the above embodiment has been described as one example of the present invention, the technical scope of the invention should not be limited to the above embodiment. It goes without saying that various modifications and improvements can be added to the above embodiment. It is also apparent from the scope of claims that the embodiment added with such modifications and improvements should be incorporated in the technical scope of the invention.

Modified Example 1

In the above embodiment, the changing unit 34 changes one of the depth of cut CA and the pitch PS, but may be configured to change both the depth of cut CA and the pitch PS. Specifically, regardless of whether the degree of abrasion or the degree of chipping is detected by the wear detection unit 32 as the degree of wear, the changing unit 34 decreases the pitch PS and increases the depth of cut CA as the degree of abrasion or the degree of chipping is greater. Also in this case, machining accuracy can be improved.

Modified Example 2

In the above-described embodiment, the changing unit 34 changes the machining condition (depth of cut CA or pitch PS) according to the degree of wear (the degree of abrasion or chipping) detected by the wear detection unit 32. However, when the degree of wear (the degree of abrasion or chipping) detected by the wear detection unit 32 is equal to or greater than the threshold, the changing unit 34 may stop the hale machining.

That is, when the wear detection unit 32 detects the degree of wear (the degree of abrasion or chipping), the changing unit 34 compares the detected degree of wear with a predetermined threshold for stopping. The threshold for stopping may be the same as or different from the threshold (threshold for notification) used by the notification unit 36.

Here, when the degree of wear (the degree of decrease or chipping) detected by the wear detection unit 32 is less than the threshold value, the changing unit 34, in response to the degree of wear (the degree of decrease or chipping), changes the machining condition (depth of cut CA or pitch PS) as described above.

On the other hand, when the degree of wear (the degree of abrasion or chipping) detected by the wear detection unit 32 is equal to or greater than the threshold, the changing unit 34 generates an emergency stop signal and outputs the generated emergency stop signal to the controller 16, to thereby stop the hale machining. In this case, the changing unit 34 does not change the machining condition (depth of cut CA or pitch PS).

Modified Example 3

In the above embodiment, the machining condition changing device 20 includes the signal processing unit 22. However, the controller 16 may include the signal processing unit 22.

Modified Example 4

The above embodiment and modified examples may be arbitrarily combined as long as no technical insistency occurs.

Inventions Obtained from the Embodiment

Inventions that can be grasped from the above embodiment and modified examples will be described below.

First Invention

The first invention is a machine tool (10) that performs a hale machining for cutting a workpiece (WK) along a cutting direction at a specified depth of cut (CA) and at intervals of a specified pitch (PS) using a tool (TL). This machine tool (10) includes: an imaging unit (18) configured to capture an image of the tool (TL) from a side of the tool (TL); a shape extraction unit (30) configured to extract the shape of the tool (TL) from the image of the tool (TL) captured by the imaging unit (18); a wear detection unit (32) configured to detect the degree of wear of the tool (TL) based on the shape of the tool (TL); and a changing unit (34) configured to change at least one of the pitch (PS) and the depth of cut (CA) according to the degree of wear.

In the first invention, since the degree of wear is detected based on the shape of the tool (TL) extracted from the image, it is possible to change the machining condition for the hale machining so as to be suitable for the actual shape of the tool (TL). As a result, machining accuracy can be improved.

The wear detection unit (32) may be configured to detect the degree of abrasion of the tip of the tool (TL) as the degree of wear of the tool (TL), and the changing unit (34) may be configured to increase the depth of cut (CA) as the degree of abrasion is greater. Thereby, the depth of cut (CA) can be appropriately adjusted.

The wear detection unit (32) may be configured to detect the degree of chipping at the tip of the tool (TL) as the degree of wear of the tool (TL), and the changing unit (34) may be configured to decrease the pitch (PS) as the degree of chipping is greater. Thereby, the pitch (PS) can be appropriately adjusted.

The machine tool (10) further may include a notification unit (36) configured to give a notice that the tool (TL) should be replaced, when the degree of wear is equal to or more than a threshold. Thereby, it is possible to prompt the operator (user) to replace the tool (TL) and thereby suppress reduction in machining accuracy due to tool aging.

The tool (TL) may be a hale tool, and the imaging unit (18) may be configured to capture the image of the tool (TL) from the rake face side of the hale tool. This makes it possible to appropriately detect the degree of wear of the tool (TL).

Second Invention

The second invention is a machining process change method for a machine tool (10) that performs a hale machining for cutting a workpiece (WK) along a cutting direction at a specified depth of cut (CA) and at intervals of a specified pitch (PS) using a tool (TL). This machining process change method includes: a shape extraction step (S1) of extracting the shape of the tool (TL) from an image of the tool (TL); a wear detecting step (S2) of detecting the degree of wear of the tool (TL) based on the shape of the tool (TL); and a change step (S3) of changing at least one of the pitch (PS) and the depth of cut (CA) according to the degree of wear.

In the second invention, since the degree of wear is detected based on the shape of the tool (TL) extracted from the image, it is possible to change the machining condition for the hale machining so as to be suitable for the actual shape of the tool (TL). As a result, machining accuracy can be improved.

The wear detecting step (S2) may detect the degree of abrasion of the tip of the tool (TL) as the degree of wear of the tool (TL), and the change step (S3) may increase the depth of cut (CA) as the degree of abrasion is greater. Thereby, the depth of cut (CA) can be appropriately adjusted.

The wear detecting step (S2) may detect the degree of chipping at the tip of the tool (TL) as the degree of wear of the tool (TL), and the change step (S3) may degrease the pitch (PS) as the degree of chipping is greater. Thereby, the pitch (PS) can be appropriately adjusted.

The machining process change method may further includes a notification step (S5) of giving a notice that the tool (TL) should be replaced, when the degree of wear is equal to or greater than a threshold. Thereby, it is possible to prompt the operator (user) to replace the tool (TL) and thereby suppress reduction in machining accuracy due to tool aging.

What is claimed is:

1. A machine tool that performs a hale machining for cutting a workpiece along a cutting direction at a specified depth of a cut and at intervals of a specified pitch using a hale tool, the machine tool comprising:
   a tool support and the hale tool, the hale tool being mounted to the tool support during cutting of the workpiece;
   an image capturer configured to capture an image of the hale tool from a side of the hale tool; and
   a signal processor configured to:
      extract a shape of the hale tool from the image of the hale tool that was captured by the image capturer;
      detect a degree of wear of the hale tool based on the extracted shape of the hale tool;
      detect whether there is a chip at a tip of the hale tool based on the extracted shape of the hale tool;
      detect a degree of abrasion of the tip of the hale tool as the degree of wear of the hale tool when there is no chip at the tip of the hale tool, and increase the depth of cut as the degree of abrasion increases; and
      detect a degree of chipping as the degree of wear of the tool when there is a chip at the tip of the hale tool, and decrease the pitch as the degree of chipping increases.

2. The machine tool according to claim 1, wherein the signal processor is further configured to give a notice that the hale tool should be replaced when the degree of wear is equal to or more than a threshold.

3. The machine tool according to claim 2, wherein at least one of a speaker that outputs sound and a light emitter that emits light is used for the notice that the hale tool should be replaced.

4. The machine tool according to claim 1, wherein the signal processor is further configured to capture the image of the hale tool from a rake face side of the hale tool.

5. The machine tool according to claim 1, wherein, based on the extracted shape of the hale tool, a length of the hale tool is
a parameter that defines the degree of the abrasion.

6. The machine tool according to claim 1, wherein based on the extracted shape of the hale tool, at least one of a depth of the chip, a width of the chip, and an area of the chip is a parameter that defines the degree of chipping.

7. The machine tool according to claim 1, wherein the shape of the hale tool from the image of the hale tool that was captured by the image capturer is extracted by binarizing the image so as to obtain a boundary between the hale tool and a background in the image.

8. A machining process change method for a machine tool configured to perform a hale machining for cutting a workpiece along a cutting direction at a specified depth of cut and at intervals of a specified pitch using a hale tool, the machining process change method comprising:
   providing the machine tool according to claim 1 as the machine tool configured to perform the hale machining;
   extracting a shape of the hale tool from an image of the tool;
   detecting a degree of wear of the hale tool based on the shape of the hale tool;
   detecting whether there is a chip at a tip of the hale tool based on the extracted shape;
   detecting a degree of abrasion of the tip of the hale tool as the degree of wear of the hale tool when there is no chip at the tip of the hale tool, and increasing the depth of cut as the degree of abrasion increases; and
   detecting a degree of chipping as the degree of wear of the tool when there is a chip at the tip of the hale tool, and decreasing the pitch as the degree of chipping increases.

9. The machining process change method according to claim 8 further comprising giving a notice that the hale tool should be replaced when the degree of wear is equal to or greater than a threshold.

10. The machining process change method according to claim 9, wherein at least one of a speaker that outputs sound and a light emitter that emits light is used for the notice that the hale tool should be replaced.

11. The machining process change method according to claim 8, wherein the shape of the hale tool from the image of the hale tool that was captured is extracted by binarizing the image so as to obtain a boundary between the hale tool and a background in the image.

* * * * *